United States Patent [19]
Habegger

[11] 3,815,207
[45] June 11, 1974

[54] MEANS FOR ALIGNING COIL INJECTION TOOLING WITH A STATOR CORE

[75] Inventor: Richard J. Habegger, Grabill, Ind.

[73] Assignee: General Electric Company, Ft. Wayne, Ind.

[22] Filed: Dec. 4, 1972

[21] Appl. No.: 311,770

[52] U.S. Cl............. 29/205 R, 29/205 D, 29/596, 29/606
[51] Int. Cl. .......................................... H02k 15/00
[58] Field of Search...... 29/596, 606, 205 R, 205 D, 29/205 E; 140/92.1

[56] References Cited
UNITED STATES PATENTS

| | | | |
|---|---|---|---|
| 3,324,536 | 6/1967 | Hill | 29/205 E |
| 3,389,865 | 6/1968 | Stuckey | 242/1.1 |
| 3,507,029 | 4/1970 | Stuckey et al. | 29/205 D |
| 3,608,176 | 9/1971 | Wieckhorst | 29/205 R |
| 3,685,118 | 8/1972 | Payne et al. | 29/205 R |
| 3,689,976 | 9/1972 | Donovan | 29/205 D |

FOREIGN PATENTS OR APPLICATIONS
730,684  1/1943  Germany

*Primary Examiner*—Charles W. Lanham
*Assistant Examiner*—Carl E. Hall

[57] ABSTRACT

Method and apparatus for inserting prewound coils into stator core slots is disclosed comprising a plurality of movable elongated thin-walled members each adapted to fit around a stator tooth and slide there along so as to extend beyond the stator and allow the subsequent movement of coils along the members and into selected stator slots and a peripherally serrated tool for aligning a stator core with the elongated members so that prewound coils may be placed over selected ones of the elongated members, the alignment tool placed thereon, the stator passed over the alignment tool onto the members and the coils subsequently inserted into stator slots.

5 Claims, 6 Drawing Figures

PATENTED JUN 11 1974 3,815,207

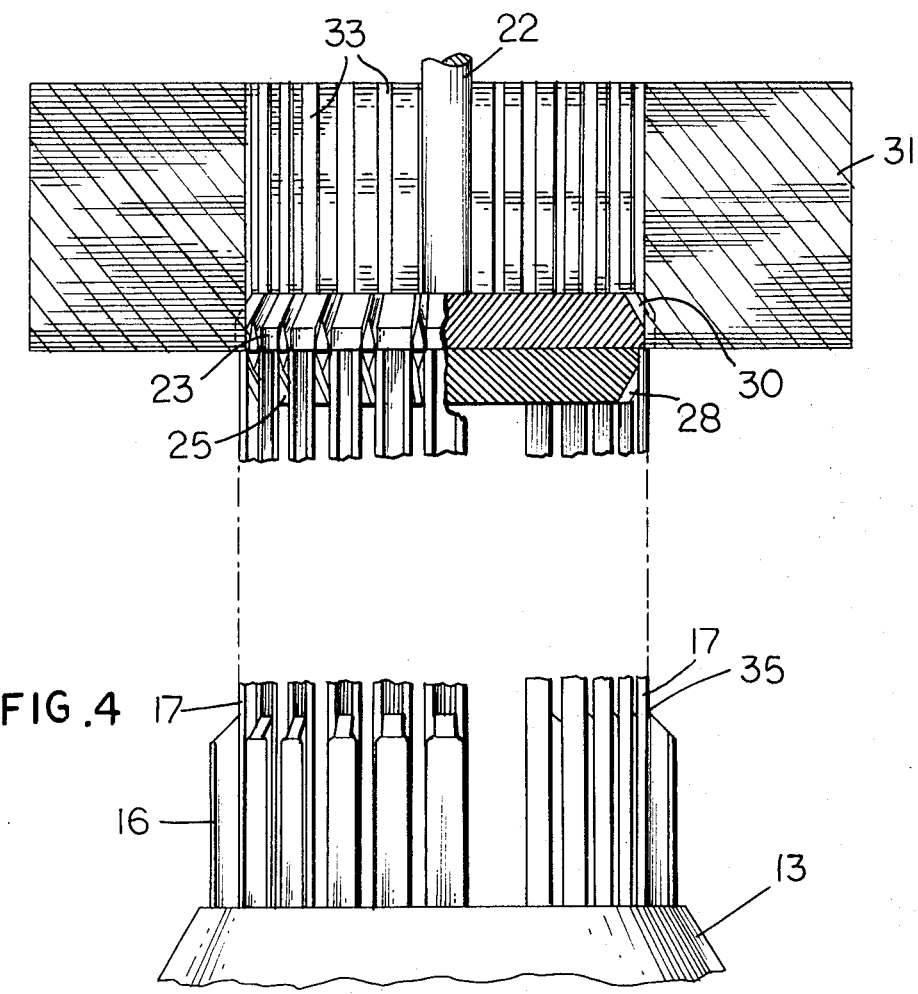
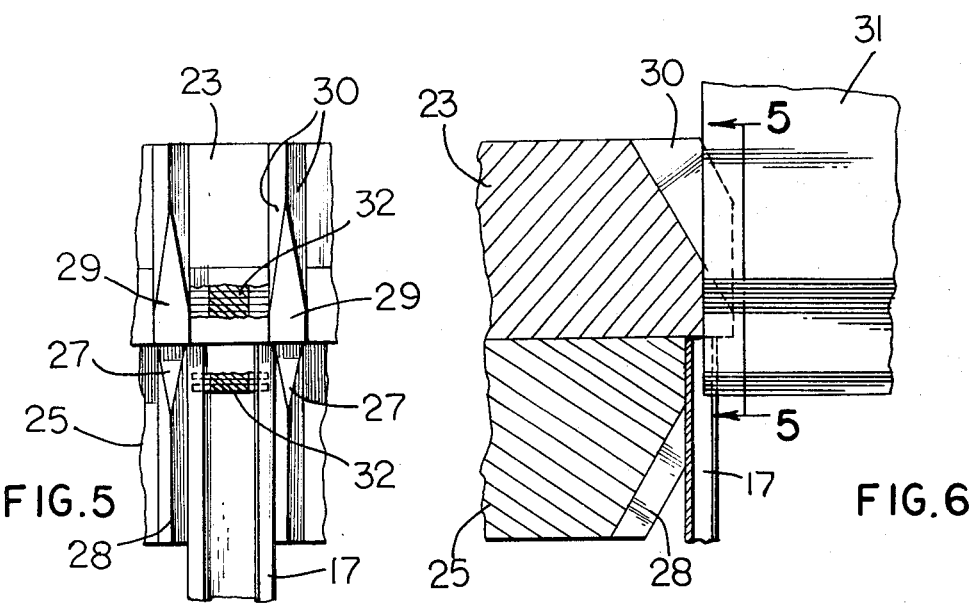

MEANS FOR ALIGNING COIL INJECTION TOOLING WITH A STATOR CORE

CROSS REFERENCE TO RELATED APPLICATIONS

Smith application Ser. No. 311,769, titled WIRE PROTECTING COIL PLACING METHOD AND APPRATUS, and filed on the same day as this application is a related application. Schlaudroff and McKinley application Ser. No. 311,815, titled WINDING INSERTING APPARATUS, and filed on the same day as this application also is a related application.

BACKGROUND OF THE INVENTION

The present invention relates generally to improved apparatus and methods for developing windings in electromagnetic devices and more particularly to apparatus and method for injecting prewound coils into stator cores. More specifically the present invention relates to a system for aligning a stator with a plurality of thin-walled members after which the aligning device may be removed and prewound coils moved along these members and into the slots between adjacent stator teeth.

Various forms of apparatus and methods for developing windings in the slots of dynamoelectric machine stators are known in the art. One general approach known heretofore involves the development and placement of winding coils (each formed of one or more winding turns) in tools that then are used while placing the winding coils into stator slots. This approach may involve the use of equipment illustrated, for example, in Mason U.S. Pat. No. 2,934,099; Duff et al., U.S. Pat. No. 3,528,170; Hill U.S. Pat. No. 3,324,536; Smith U.S. Pat. No. 3,514,837; Cutler et al., U.S. Pat. No. 3,522,650; Arnold U.S. Pat. No. 3,672,039; or copending application Ser. No. 306,527 filed Nov. 15, 1972 in the names of McKinley and Schlaudroff, the disclosures of all of which are incorporated herein by reference. With the equipment illustrated in any of the just mentioned cases, winding turns are generated and coil groups developed, and only then are the winding turns placed or "injected" into the slots of a laminated magnetizable core.

The prior coil injection systems generally employ a plurality of rigid blades or fingers that mate with corresponding stator teeth, and on occasion in prior systems, alternate ones of the blades are affixed to a stripper while other ones of the blades are secured or fixed to a blade support that is movable relative to the stripper.

In coil injection systems of the type above referred to, at least a portion of each winding turn is passed between adjacent stator teeth and into a core slot. These stator teeth typically will have sharp edges, burrs, and generally rough or saw tooth side walls or edges that may on occasion cause damage to the winding material during the injection procedure. Most present day stators comprise a stack of relatively thin punch press produced laminations which present rough edges not only to the stator bore but also along the interior portions of the stator slot and particularly along those portions of a stator tooth just inside the stator slot. Prior art coil injection systems may prevent direct contact between the windings and the portions of the stator teeth facing into the stator bore as well as the sharp corners thereof but do not prevent such contact along those portions of the stator tooth interior to the slots. Moreover, when the fingers or blades are of the individual "pin" type as shown, for example, in FIG. 9 of Hill U.S. Pat. No. 3,324,536; the lips that are provided to slightly project into the slots of the stator core must be relatively thick (e.g. on the order of about 0.010 to 0.015 of an inch thick each, with a dimension therebetween that is about 0.005 of an inch greater than the core tooth width at the bore). Slot openings for many fractional horsepower motors on the other hand, typically range from about 0.085 to 0.095 of an inch. Therefore, it will be understood that from about 0.022 to 0.033 of an inch of a typical slot opening for a core will be obstructed or blocked because of the relatively rigid lips on tooling of the type presently known.

In the aforementioned copending Smith application the plurality of rigid fixed blades which accept a stator during a coil injection operation have been replaced by a plurality of movable elongated thin-walled members of a substantially uniform cross-sectional configuration which are disposed in parallel upstanding relation about the periphery of a circle and which are movable in unison in a direction substantially perpendicular to the plane of that circle (which direction corresponds to the stator bore axis) through the bore of the stator to provide a smooth surface along which preplaced coils may be moved for insertion into selected stator slots. While this approach works quite well to provide virtually damage free stator windings, the process of placing a stator core onto these upstanding members is relatively slow since the members are somewhat flexible and fit about the stator teeth to relatively close tolerences and it is somewhat difficult to get every such upstanding member properly aligned with the corresponding stator tooth at the same time. Flaring the top end of each of the upstanding members helps somewhat but the process of placing the stator on the members is still somewhat troublesome and time consuming.

Accordingly it is one object of the present invention to provide a method and apparatus for aligning a stator core and corresponding coil injection tooling.

It is another object of the present invention to facilitate a coil injection operation.

It is a further object of the present invention to provide an improved coil injection system.

Still another object of the present invention is to provide a stator core aligning tool which may be placed on coil injection tooling, a stator passed thereover and onto the tooling and the alignment tool removed so as to not interfere with subsequent insertion of prewound coils into the stator.

SUMMARY OF THE INVENTION

In accordance with the present invention in a preferred form a coil injection machine for the injection of prewound coils into selected slots of a magnetic stator core is provided with a plurality of elongated upstanding thin-walled members for receiving prewound coils, each member having a substantially uniform cross-sectional configuration for at least a distance equal to the stack height of a stator core in which the coils are to be placed. The alignment tool comprises a pair of superposed coaxial generally flat circular plates with one of the plates being slightly larger than the other to form a ledge therebetween which prevents movement of the tool into the upstanding members beyond the ledge.

The periphery of each plate is serrated with the smaller plate serrations adapted to orient the tool relative to the upstanding members and the larger plate serrations adapted to orient a stator relative to the tool. The serrations are aligned to allow the passage of a stator over the tool and onto the coil injection tooling. The serrations may both comprise wedge shaped protrusions to facilitate the placement of the tool onto the coil injection tooling and the placement of the stator over the tool.

BRIEF DESCRIPTION OF THE DRAWING

The aforementioned and other objects, features and advantages of the present invention will become more apparent in the following detailed description thereof when considered in conjunction with the drawings wherein:

FIG. 4 is a side elevation view of a portion of the machine of FIG. 3 broken away to illustrate the meshing of tooling, stator aligning tool, and stator;

FIG. 5 is a side view of a portion of the serrated edge of the alignment tool of FIG. 1 with a blade and stator tooth engaged therewith; and FIG. 6 is a cross-sectional view of the elements of FIG. 5.

DESCRIPTION OF THE PREFERRED EMBODIMENT

Figure 3:
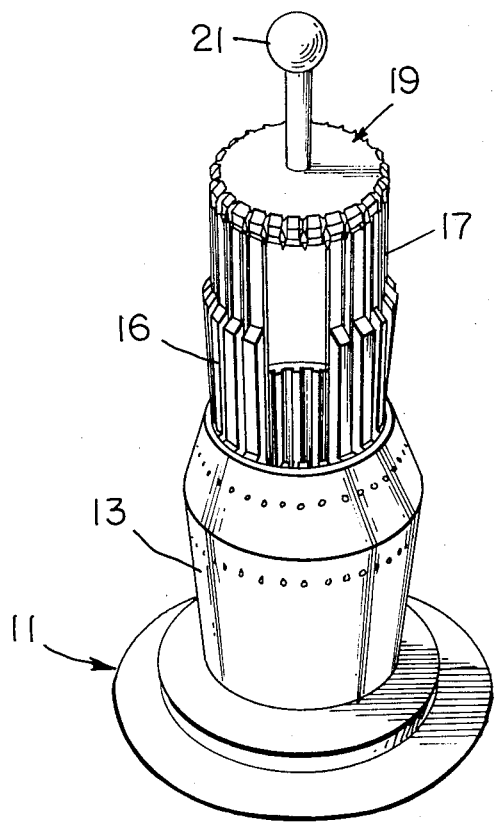
FIG. 3 is a perspective view of a coil injection machine emboding the present invention.

In FIG. 3 a coil injection machine 11 having a head 13 which supports tooling for placing prewound coils into the slots of a magnetic stator core is illustrated and may preferrably be of the type disclosed in the aforementioned copending Smith application. The tooling may include a plurality of wedge guides 16 and a plurality of movable elongated thin-walled members 17 each of which partially surrounds a portion of a corresponding wedge guide 16 and is movable along that wedge guide in its direction of elongation. The members 17 are illustrated in this figure in their extended position which they would normally occupy when a stator was in place and ready to receive windings. In operation, one or more coils which are to be inserted in a magnetic core are selectively looped over the upstanding members 17 and slid down into respective slots between the wedge guides 16 and a stator is placed onto the tooling so that each of the members 17 fits around or covers a corresponding stator tooth and the members 17 function to prevent wire damage when a stripper (not shown) forces the coils of wire along the members 17 and into selected stator slots. Placement of the stator onto the members 17 is facilitated by the tool 19 which aligns the stator core and the members 17 and is shown in greater detail in FIG. 1.

Figure 1:
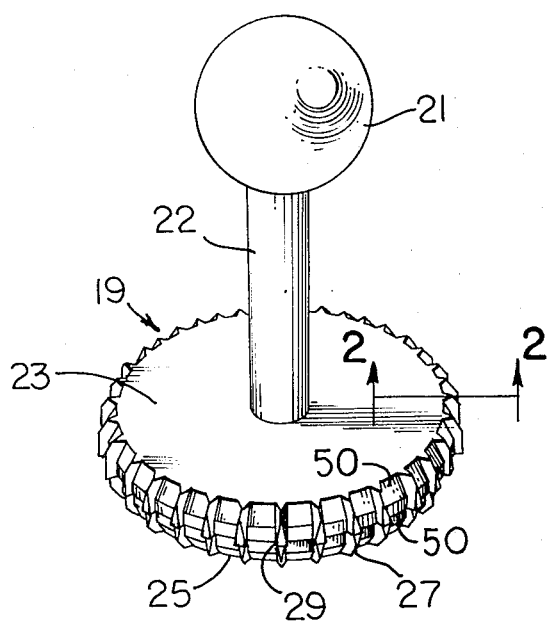
FIG. 1 is a perspective view of a stator aligning tool according to the present invention.
Figure 2:
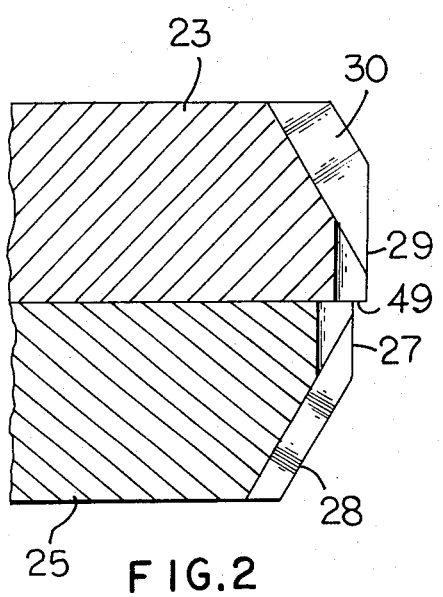
FIG. 2 is a cross-sectional view along the lines 2—2 of FIG. 1.

The tool of FIG. 1 is seen to comprise a handle 21 which may be easily grasped for placement or removal of the tool which connects by way of a shaft 22 to a pair of superposed coaxial generally flat circular plates 23 and 25 with the plate 23 being slightly larger than the plate 25 to form a ledge 49 between these two plates. It is this ledge along with the protrusion 29 (which is larger than the protrusion 27) which allows the tool 19 to be placed on the members 17 in the position illustrated in FIG. 3 without passing on into the tooling. The creation of this ledge is more clearly seen in FIG. 2 where the larger plate 23 overhangs the smaller plate 25 around its entire periphery and further the protrusion 29 extends out beyond the protrusion 27 to thus form a series of notches 50 about the periphery of the tool which will pass only part way into the plurality of members with each notch accepting, for less than its entire length, a corresponding elongated member. The peripherally notched tool 19 will however, just pass through a stator bore (e.g., with a slip-fit clearance) with each notch 50 between adjacent protrusions 29 accepting a corresponding stator tooth as is more clearly seen in FIGS. 4, 5 and 6.

As seen in FIGS. 1, 4 and 5 each of the serrations around the periphery of the smaller plate 25 comprises a generally wedge shaped protrusion which will facilitate the placing of the tool 19 onto the members 17 while each of the serrations around the periphery of the larger plate 23 similarly comprises a wedge shaped protrusion for facilitating the placement of a stator over the tool. As is clearly seen these wedge shaped protrusions form the lower member accepting notches which are flared in the downward direction as viewed and the upper stator accepting notches which are flared upwardly to accept a stator.

In FIG. 4 a stator 31 having slots 33 is shown being slid downwardly over the tool and toward the engagement with the members 17. As noted in the aforementioned copending Smith application this stator will continue to slide down on the members 17 until it bottoms on the wedge guides 16 at the point 35. The members 17 will then be moved upwardly to extend on through the stator bore. The progress of a representative few stator tooth laminations are presented by the cross sections 32 in FIG. 5 may be helpful. As the stator tooth proceeds downwardly the tapered surfaces 30 serve to center that tooth and of course all of the other teeth between the wedge shaped protrusions 29 so that when the stator tooth reaches the bottom of these protrusions 29 it is accurately aligned therebetween. The member 17 which is a "C" shaped member, or preferrably as disclosed in the aforementioned Smith application, a "3" shaped member, closely corresponds to the configuration of the tooth and the tooth may easily slide from between the members 29 into the members 17 and continue its downward travel now properly aligned with that member. Similarly in the original placement of the alignment tool onto the upstanding members 17, the wedge shaped protrusion 27 functioned similarly to center and accurately align each of the members 17 with the tool, however, the progress of the tool in the downward direction was halted by the ledge formed by the larger protrusions 29 as well as the back wall formed by the generally larger flat plate 23.

The method of the present system should now be clear and in the overall process prewound coils are selectively looped over the plurality of upstanding members 17 and then the alignment tool 19 is placed on the free ends of those upstanding members. The magnetic core is then slid over the alignment tool and onto the upstanding members so that certain ones of the members pass at least part way into each of two adjacent stator slots. The members 17 may then, if desired, be slid upwardly by means not shown until they extend beyond the stator slots at both ends thereof whereupon a stripper moves upwardly to force the coils along the upstanding members and into the selected stator slots. The alignment tool 19 is desireably removed prior to the step of moving the coils and after the magnetic core is placed onto the members 17 so that this alignment tool does not interfere with the process of moving the coils into the appropriate slots, however, it is possible to leave the alignment tool in place until the stripper forces it upwardly and off the tooling. Movement of the members 17 as well as movement of the coils into their respective slots is, as noted in the aforementioned copending Smith application, desireably a simultaneous operation for all of the coils and a simultaneous operation for all of the alignment members or blades 17.

In summary then the alignment tool of the present invention comprises a pair of flat circular serrated plates of differing diameters with the smaller plate serrations adapted to orient the tool relative to the coil injection tooling and the larger plate serrations adapted to orient a stator relative to the tool. The alignment tool may be placed onto the coil injection tooling substantially inscribed within the tooling, a stator passed thereover to circumscribe the tooling, and the alignment tool removed so as to not interfere with subsequent insertion of prewound coils into the stator.

Thus while the present invention has been described with respect to a specific preferred embodiment numerous modifications will suggest themselves to those of ordinary skill in the art and accordingly the scope of the present invention is to be measured only by that of the appended claims.

What I claim as new and desire to secure by Letters Patent of the United States is:

1. In tooling for placing prewound coils into selected slots of a magnetic stator core, the improvement comprising in combination:
    a plurality of elongated upstanding thin-walled members for receiving the prewound coils, each having a substantially uniform cross-sectional configuration for at least a distance equal to the stack height of a stator core in which the coils are to be placed; and
    means for aligning an internal surface of a stator core and said members to thereby allow the placement of a stator core onto said members for subsequent insertion of the coils into selected stator slots, said means for aligning being movable relative to the thin-walled members.

2. The improvement of claim 1 wherein each member is adapted to fit around a single stator tooth, further comprising means for simultaneously moving the members along respective stator teeth prior to the insertion of the coils into selected stator slots.

3. In tooling for placing prewound coils into selected slots of a magnetic stator core, the improvement comprising in combination:
    a plurality of elongated upstanding thin-walled members for receiving the prewound coils, each having a substantially uniform cross-sectional configuration for at least a distance equal to the stack height of a stator core in which the coils are to be placed; and
    means for aligning an internal surface of a stator core and said members to thereby allow the placement of a stator core onto said members for subsequent insertion of the coils into selected stator slots;
    said means for aligning comprising a peripherally notched tool adapted to pass through a stator bore with each notch accepting a corresponding stator tooth and to pass at least part way into the plurality of members with each notch accepting for less than the entire length of such notch a corresponding elongated member whereby the tool may be placed onto the upstanding members and a stator then placed thereover to engage the members.

4. The improvement of claim 3 wherein each member is adapted to fit around a single stator tooth, each tool notch lying between a pair of wedged shaped protrusions for facilitating the placement of the tool onto the members and between a pair of wedge shaped protrusions for facilitating the placement of a stator over the tool.

5. The improvement of claim 4 wherein the tool comprises a pair of superposed coaxial generally flat circular plates with one of said plates being slightly larger than the other to thereby form a ledge therebetween which prevents movement of the tool onto the members beyond the ledge.

* * * * *